United States Patent [19]

Angell

[11] Patent Number: 5,499,859

[45] Date of Patent: Mar. 19, 1996

[54] UPHOLSTERY ATTACHMENT DEVICE AND UPHOLSTERED ARTICLE USING SAME

[75] Inventor: Robert C. Angell, Spring Lake, Mich.

[73] Assignee: Steelcase, Inc., Grand Rapids, Mich.

[21] Appl. No.: 237,855

[22] Filed: May 4, 1994

[51] Int. Cl.$^6$ ........................................... A47C 31/00
[52] U.S. Cl. ........................ 297/218.3; 297/452.65; 297/452.59; 297/452.2; 5/471; 5/496
[58] Field of Search ................ 297/218, 452.65, 297/452.55, 452.58, 452.59, 452.2, 218.3, 218.5; 24/72.5, 545; 5/471, 498, 496, 481

[56] References Cited

U.S. PATENT DOCUMENTS

| | | |
|---|---|---|
| 826,748 | 7/1906 | Reeve . |
| 3,600,764 | 8/1971 | Froehlich . |
| 3,758,159 | 9/1973 | Morris . |
| 3,844,614 | 10/1974 | Babbs . |
| 4,158,936 | 6/1979 | Fulton . |
| 4,284,305 | 8/1981 | Porter et al. . |
| 4,352,524 | 10/1982 | Crosby ........................................ 5/471 |
| 4,364,607 | 12/1982 | Tamburini . |
| 4,370,002 | 1/1983 | Koepke . |
| 4,541,137 | 9/1985 | Murray ........................................ 5/498 |
| 4,643,480 | 2/1987 | Morita . |
| 4,718,153 | 1/1988 | Armitage et al. . |
| 4,789,201 | 12/1988 | Selbert . |
| 4,798,416 | 1/1989 | Faust et al. . |
| 4,833,741 | 5/1989 | Mizuno et al. ............................. 5/471 |
| 4,890,883 | 1/1990 | Boerema et al. . |
| 5,015,034 | 5/1991 | Kindig et al. . |
| 5,016,306 | 5/1991 | Grivna et al. ............................... 5/496 |
| 5,095,591 | 3/1992 | Hubscher .................................... 5/498 |
| 5,100,204 | 3/1992 | Makihara et al. . |
| 5,121,963 | 6/1992 | Kwasnik et al. . |

FOREIGN PATENT DOCUMENTS

| | | |
|---|---|---|
| 2224000 | 8/1973 | Germany . |
| 2340831 | 3/1974 | Germany . |
| 2915558 | 10/1979 | Germany . |
| 35130768 | 10/1986 | Germany . |
| WO8705480 | 9/1987 | WIPO . |

Primary Examiner—Peter M. Cuomo
Assistant Examiner—Anthony D. Barfield
Attorney, Agent, or Firm—Price, Heneveld, Cooper, DeWitt & Litton

[57] ABSTRACT

An upholstery attachment device and upholstered article, each according to the invention, each include a first elongated portion extending along at least a length of a perimeter edge of an upholstery covering and a second, cooperating elongated portion aligned with the first elongated portion to extend along the upholstery covering perimeter edge. The first elongated portion defines a first upholstery covering gripping member or jaw and the second elongated portion defines a second upholstery covering gripping member or jaw. The first and second upholstery covering gripping members are positioned relative to one another in a position of abutting one another or being, at most, slightly spaced apart to clamp the upholstery covering perimeter edge between the two gripping members.

30 Claims, 7 Drawing Sheets

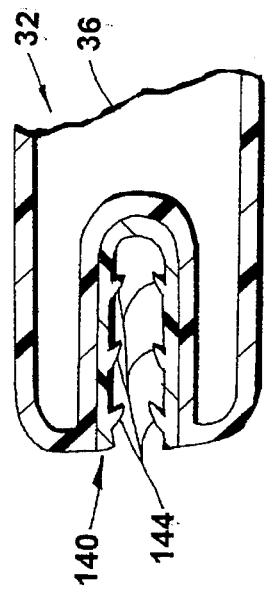
Fig. 18
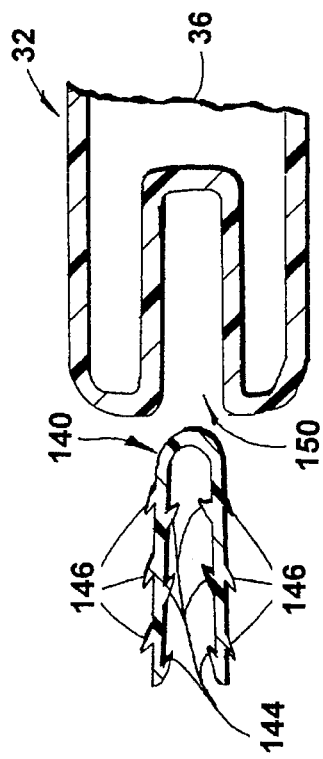
Fig. 17
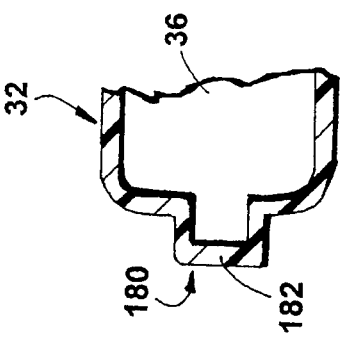
Fig. 21
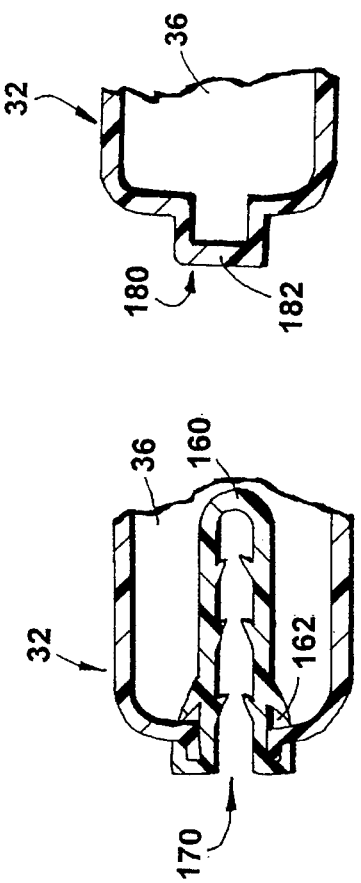
Fig. 20
Fig. 19

5,499,859

UPHOLSTERY ATTACHMENT DEVICE AND UPHOLSTERED ARTICLE USING SAME

BACKGROUND OF THE INVENTION

The invention relates to the field of upholstery and more particularly to the attachment of an upholstery covering.

The process of upholstering in which an upholstery covering is applied over at least a portion of a seating unit, for example, and is attached to the seating unit, is a labor intensive and time consuming process. The article being upholstered will typically have a frame and at least a portion of the frame will be overlaid with an upholstery covering. The upholstery covering will typically be stretched to some extent and fastened with the frame by any of a number of commonly known methods, appropriate for the particular frame material at hand. Tacks, brads, staples, and the like are commonly used to attach an upholstery covering to a wood or plastic frame. Screws, spring clips, and the like are commonly used to attach upholstery coverings to metallic frames. Of course, adhesives and other forms of bonding may be used to attach an upholstery covering to virtually any frame material.

As is commonly known and understood, the act of upholstering an item requires a level of skill and craftsmanship and a commitment of time or labor, to effect a desirable or even acceptable level of quality in a resulting upholstered article. Thus, one may readily appreciate the desirability in the manufacture or production of upholstered articles for improvements which minimize the time or labor commitment required to accomplish the upholstering task and which minimize the level of skill or craftsmanship required to accomplish a desirable or acceptable level of upholstery.

SUMMARY OF THE INVENTION

Each of an upholstery attachment device according to the present invention and an upholstered article using an upholstery attachment device according to the present invention uniquely provides for attachment of an upholstery covering to an upholstered article.

An article for upholstering has a support frame and an upholstery covering overlaying at least a portion of the support frame. The upholstery covering has a perimeter edge and the support frame includes an upholstery attachment device located at the upholstery covering perimeter edge.

The upholstery attachment device has a first elongated portion extending along at least a length of the upholstery covering perimeter edge and has a second, cooperating elongated portion aligned with the first elongated portion to extend along the upholstery covering perimeter edge. The first elongated portion defines a first upholstery covering gripping member and the second elongated portion defines a second upholstery covering gripping member. The upholstery covering perimeter edge is interposed between the first and second elongated portions to clamp the upholstery covering between the first and second upholstery covering gripping members.

In one aspect of the invention, the support frame is a hollow member defined by a shell and may further be constructed in accordance with the blow molding process of fabricating plastic articles. In another aspect of the invention, the first and second upholstery covering gripping members of the upholstery attachment device define a slot extending through the shell of the support frame and extending along at least a length of the upholstery covering perimeter edge. Two opposing sides of the shell of the support frame may contact one another in a vicinity located near the upholstery attachment device to structurally stiffen the first and second elongated portions of the upholstery attachment device. In yet another aspect of the invention, stiffening ribs may be formed in one, the other, or both of the first and second elongated portions of the upholstery attachment device to structurally stiffen the upholstery attachment device and enhance the clamping of the upholstery covering between the first and second upholstery covering gripping members.

According to other aspects of the invention, the upholstery attachment device may be integrally formed with the support frame, formed as a separate, generally tubular member and attached to the support frame; and integrally formed in one piece with a one piece support frame.

These and other features, objects, and benefits of the invention will be recognized by those who practice the invention and by those skilled in the art, from the specification, the claims, and the drawing figures.

BRIEF DESCRIPTION OF THE DRAWINGS

FIG. 17 is the view of FIG. 5 showing an alternative embodiment of an upholstery attachment device according to the invention, in exploded condition;

FIG. 18 is the view of FIG. 17 in an assembled condition;

FIG. 19 is the view of FIG. 18 showing a second alternative embodiment of an upholstery attachment device according to the invention;

FIG. 20 is the view of FIG. 18 showing a third alternative embodiment of an upholstery attachment device according to the invention; and FIG. 21 is the view of FIG. 5 showing a support frame prior to machining to accept an upholstery attachment device according to one of the embodiments of FIG. 19 and FIG. 20.

DESCRIPTION OF THE PREFERRED EMBODIMENTS

Figure 1:
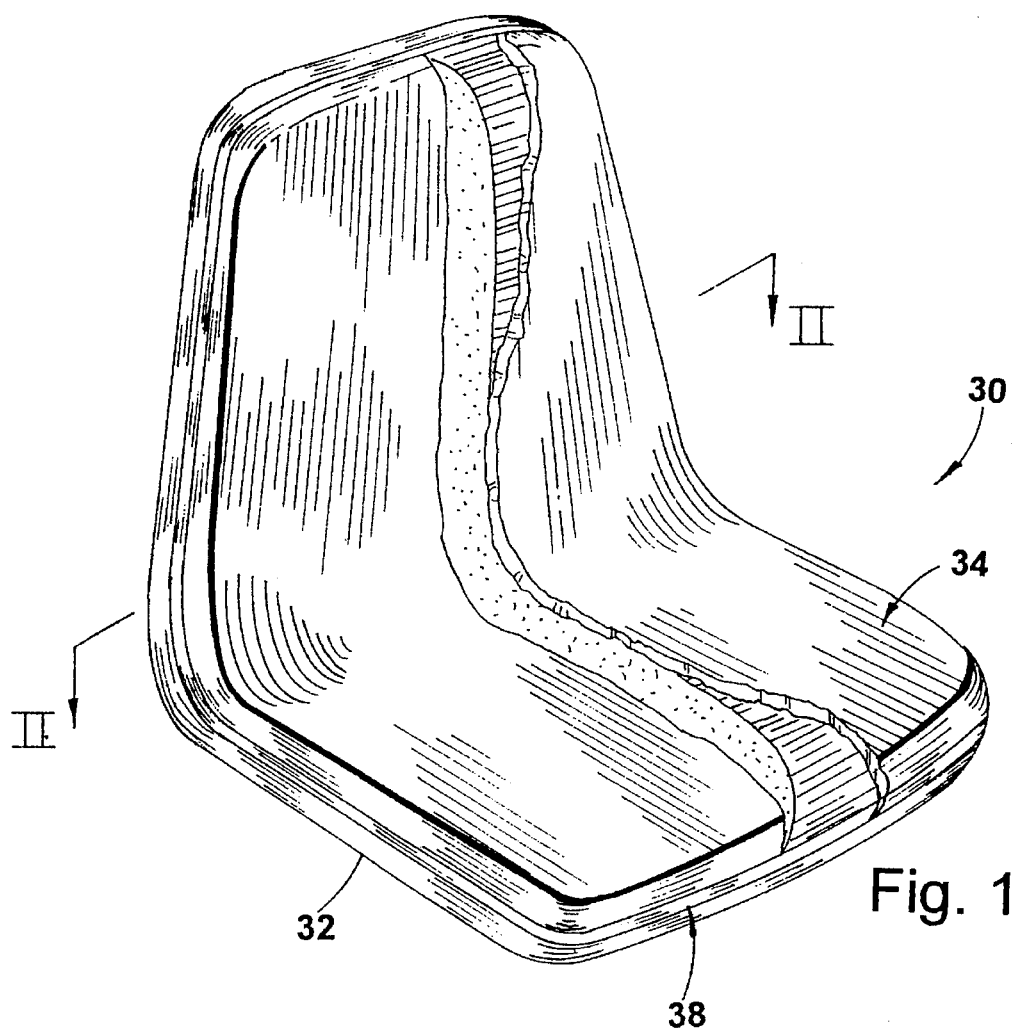
FIG. 1 is a fragmentary front perspective view of a seating unit according to the invention.
Figure 2:
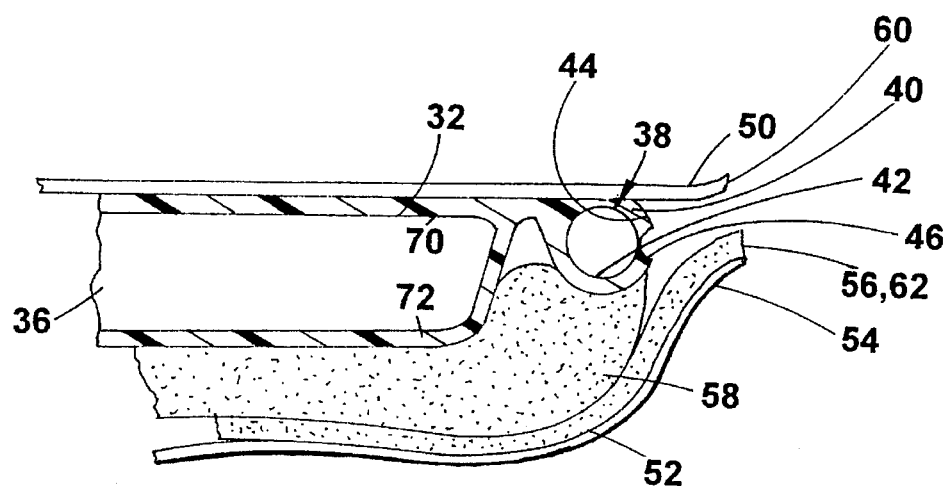
FIG. 2 is a fragmentary sectional view along line II—II of FIG. 1.

A preferred embodiment of a seating unit according to the present invention as shown in FIGS. 1 and 2 and generally designated by the numeral 30. Seating unit 30 includes a support frame 32 and an upholstery covering 34.

Support frame 32 is preferably a hollow member defined by a shell 36 and may be fabricated by well known processes for forming components with hollow cross sections, commonly referred to as blow molding or rotational molding and the like. Any of various resilient, rigid structural materials suitable for blow mold fabrication may be successfully used for the invention, including, but not limited to, vinyl polymers and copolymers such as PVC and PVC-acetate. Support frame 32 may be a one piece member with an upholstery attachment device 38 molded in one piece with support frame 32. Alternatively, upholstery attachment device 38 may be a separate, generally tubular, member attached to support frame 32. As will be appreciated by those who practice the invention, by those skilled in upholstery, and by those who otherwise have some familiarity with upholstery, support frame 32 may be any of a range of upholstery support frames from one of multiple components comprising a larger assembly, including, but not limited to, a head rest support frame, a seat cushion support frame, a back support frame, and an arm rest cap support frame, for example, to an integral support frame which provides at least seat back support and seat cushion support in one piece.

Upholstery attachment device 38 may be a separate, generally tubular member attached with support frame 32 or may be a generally tubular portion of support frame 32 as shown in FIG. 2 and alternatively shown in others of FIGS. 1 through 21. Upholstery attachment device 38 has a first elongated portion 40 and a second, cooperating elongated portion 42. First elongated portion 40 defines a first jaw or first upholstery covering gripping member 44 while second elongated portion 42 defines a second jaw or second upholstery covering gripping member 46. The first and second elongated portions 40 and 42 are mutually aligned with one another in a lengthwise orientation to position the first and second jaws 44 and 46 in abutting or at least near abutting orientation so a portion of upholstery covering 34 is inserted between jaws 44 and 46 to clamp and securely hold upholstery covering 34.

Upholstery covering 34 may be a single layer of upholstery material 50 as shown in FIG. 2. Upholstery covering 34 may also include a multiple layering of upholstery materials 52, including, upholstery material or fabric 54, a fabric backing 56, and an upholstery cushion 58, for example. As such, multiple layer upholstery covering 52 may comprise a cushion subassembly which may be preassembled in accordance with any of various assembly practices, including that which is the subject of commonly assigned U.S. Pat. No. 4,718,153, entitled CUSHION MANUFACTURING PROCESS and issued on Jan. 12, 1988, to Armitage et al., the disclosure of which is incorporated here by reference.

Each of upholstery coverings 50 and 52 has a perimeter edge 60 and 62, respectively. Upholstery attachment device 38 is located on support frame 32 at a position coinciding to a desired upholstery seam location on the upholstered article, namely, seating unit 30. Each perimeter edge 60 and 62 is forced between jaws 44 and 46 which, because of the resiliency of elongated portions 40 and 42 may be resistingly separated to insert perimeter edges 60 and 62 and released to clamp upholstery coverings 50 and 52 between jaws 44 and 46.

Blow molding technology is particularly suitable for use with upholstery attachment device 38, especially when device 38 is to be formed in one piece with support frame 32. A few of the various structural configurations available for support frame 32 and upholstery attachment device 38 according to the invention, are shown throughout the drawing FIGS. 1 through 21. Because the differences among the various configurations are of a magnitude relating to details regarding specific applications, and do not disrupt the basic concept of the invention, common reference numerals are used throughout the drawing Figures to identify equivalent parts or components. As is particularly shown in drawing FIGS. 5 through 8, shell 36 of support frame 32 has two opposing sides 70 and 72 which may contact one another in the vicinity of upholstery attachment device 38 at a contact point 76 to structurally stiffen one, the other, or both of elongated portions 40 and 42. Each of side 70 and side 72 (FIG. 5) deflects away from a perimeter surface 78 of shell 36 to meet at an intermediate contact point 76. This may be suitable in instances wherein each side of support frame 32 will be obscured from view, either by an upholstery covering or by orientation to be an unobserved surface.

Figure 6:
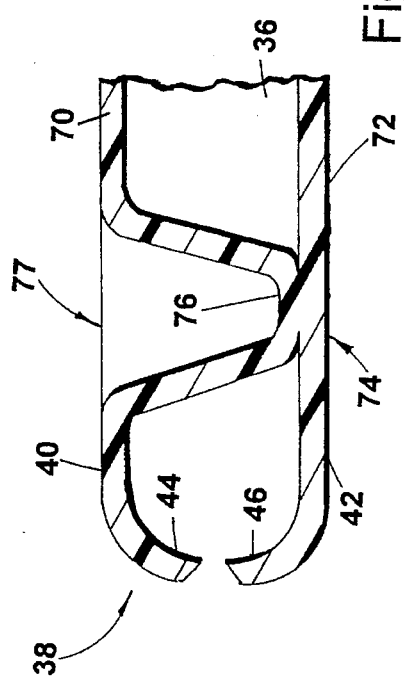
FIG. 6 the view of FIG. 5 showing a first alternative support frame configuration.
Figure 8:
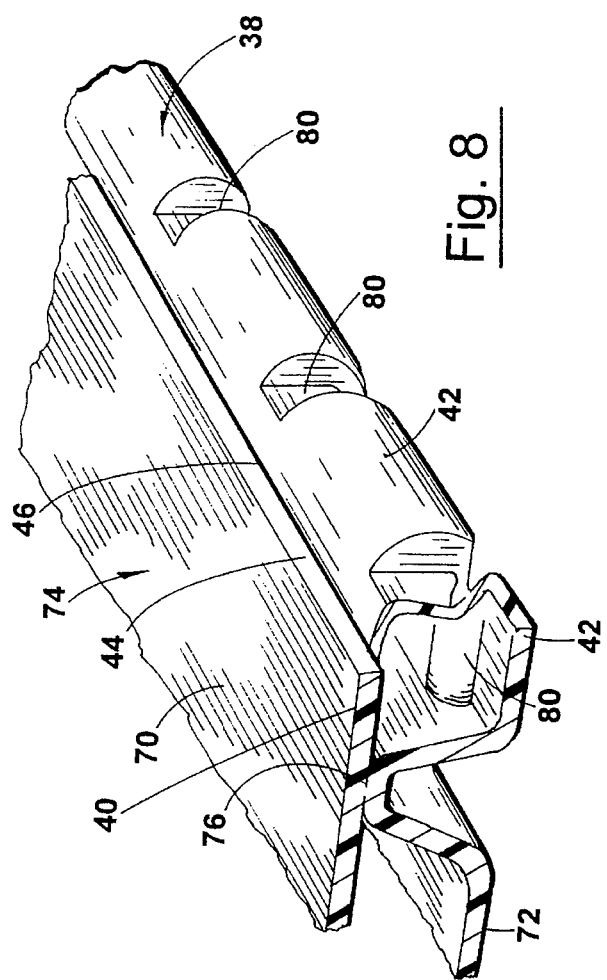
FIG. 8 is a fragmentary perspective view of a support frame of an upholstered article according to the invention and according to the configuration of FIG. 7.
Figure 5:
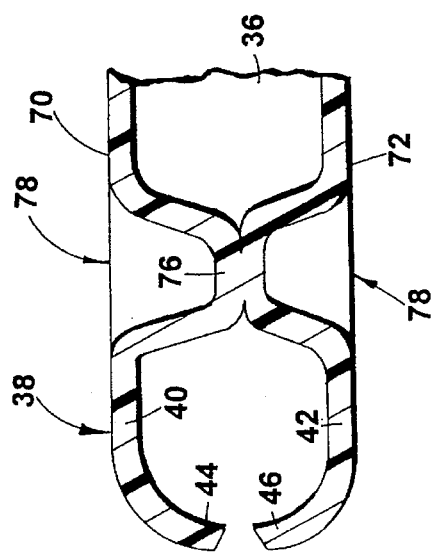
FIG. 5 is a fragmentary cross-sectional view of a support frame of an upholstered article according to the invention.
Figure 7:
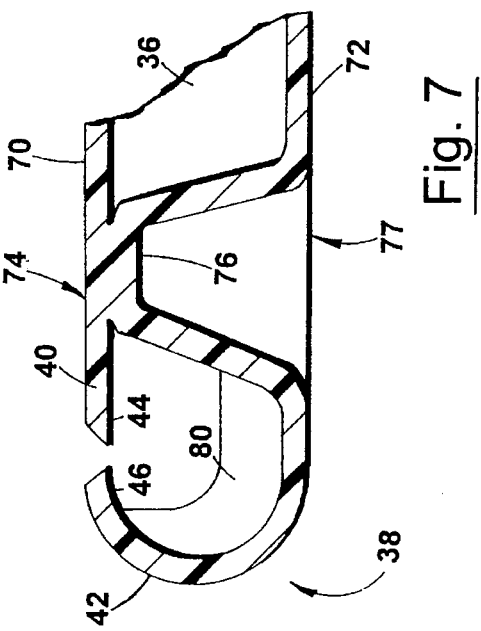
FIG. 7 is a view of FIG. 6 showing a second alternative support frame configuration.
Figure 9:
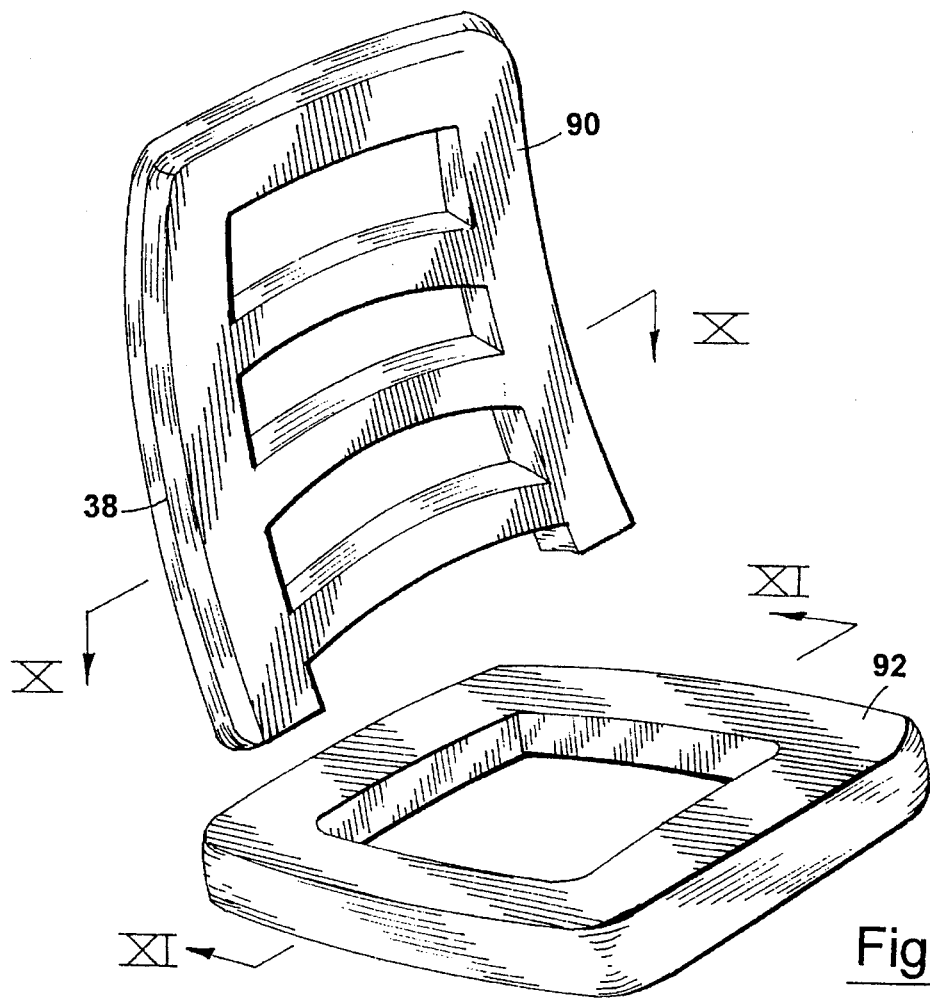
FIG. 9 is a front perspective view of a typical support frame arrangement for an automotive seating unit according to the invention.

The support frame 32 may also be provided with a finished, un-upholstered surface 74 (FIGS. 6–8). In this configuration, one of the two opposing sides 70 and 72 of shell 36 may follow the desired, finished surface 74, while the opposing side of shell 36 deflects fully across the shell to the contact point 76. Depending more particularly upon the specific application, additional stiffening ribs 80 (FIGS. 7 and 8), for example, may be formed with upholstery attachment device 38 as required to achieve a predetermined minimal stiffness or rigidity and maximum flexibility in upholstery attachment device 38 of the respective jaw 44 or 46.

An alternative embodiment of support frame 32 may implement a back support frame 90 (FIG. 9) and separate seat support frame 92 as may be used in automotive seating, for example. In an automotive embodiment, for example, structural cavities 96 may be provided in support frames 90 or 92 to accommodate further structure, including, tubular members 98. Tubular members 98 may be of any suitable cross section configuration and formed of any suitable structural material to satisfy the structural requirements of a particular application. An upholstery attachment device 38 is provided about a perimeter edge of each of back support frame 90 and seat support frame 92 to locate an upholstery seam 94 (FIG. 10) at an aesthetically desirable position. Back support frame 90 may be upholstered on both sides. As shown in FIG. 11, however, seat support frame 92 is preferably upholstered only on the top or seating surface and is provided with an upholstery attachment device 38 which positions the edge of the upholstery covering 52 at an orientation which is not typically observed, namely, under the seating unit.

Figure 12:
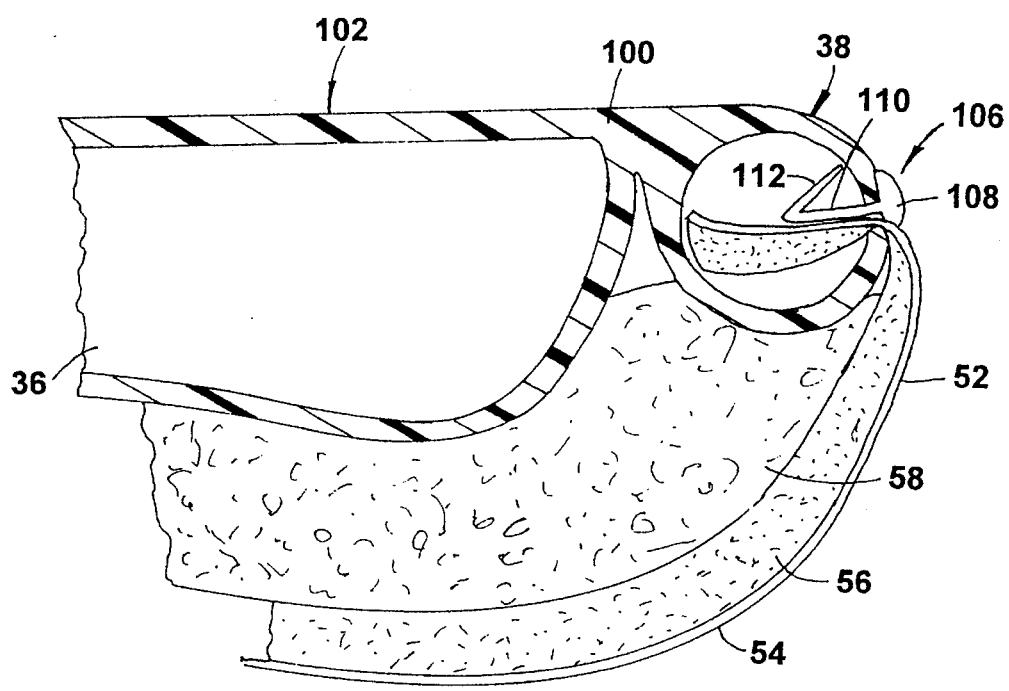
FIG. 12 is a mirror image view of FIG. 10 showing an alternative embodiment in which the seating unit back support frame is upholstered on only one side and includes an upholstery trim member.
Figure 13:
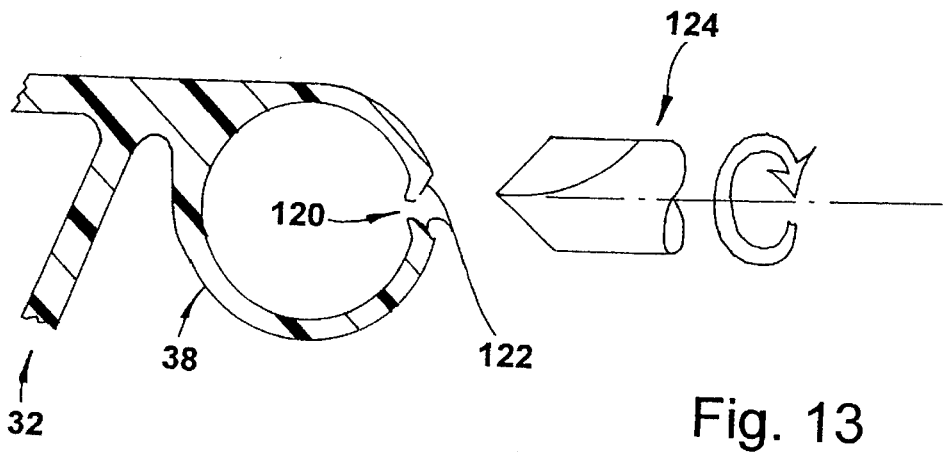
FIG. 13 is a schematic representation showing one method of forming the present invention.

Alternatively, back support frame 90 may be configured as back support frame 100 (FIG. 12), with an appropriately contoured, finished back portion 102 and may thus be upholstered on only one side. An upholstery trim strip 106 of aesthetically desirable configuration may also be applied as shown in FIG. 12. Those who practice the invention, those skilled in the art, and those who otherwise have some familiarity with upholstery will realize that trim strip 106 may be used whenever it is aesthetically pleasing or desirable to do so. Trim strip 106 has a head 108 and a shaft 110, preferably with at least one barb 112 to hold trim strip 106 securely in place. Trim strip 106 may have any of a number of cross-sectional shapes, including, but not limited to, those shown in FIGS. 12, 15, and 16, primarily as a matter of aesthetic preference.

Most preferably, a medium thick fabric with a rough backing and at least one fabric having a bonded topper are used to provide a combined thickness of at least about 0.200 inches (5 mm) in conjunction with a maximum spacing of about 0.065 inches (1.65 mm) between first and second jaws 44 and 46 of the respective upholstery attachment device 38. Of course, those who practice the invention, those skilled in the art, and those who otherwise have some level of familiarity with upholstery will appreciate that varying thicknesses of the upholstery covering may be accommodated by varying the spacing between jaws 44 and 46. While the respective jaws 44 and 46 may abut one another or may be slightly spaced, the inventor has found that the jaw spacing will typically run in the range of about 0.060 to 0.070 inches (1.52–1.78 mm) and will be dictated by the actual upholstery covering used. A minimal adequate pullout force (i.e. the force required to pull the upholstery covering out of the upholstery attachment device) for heavy use applications such as automotive seating and office seating is expected to be in the range of about three to four pounds for each linear inch (25.4 mm) of the upholstery attachment device. Adjusting the geometry of the attachment device; the geometry and roughness, including, teeth for example, of the gripping members 44 and 46; and the physical characteristics of the materials employed, will directly affect the resulting pull out force.

Figure 3:
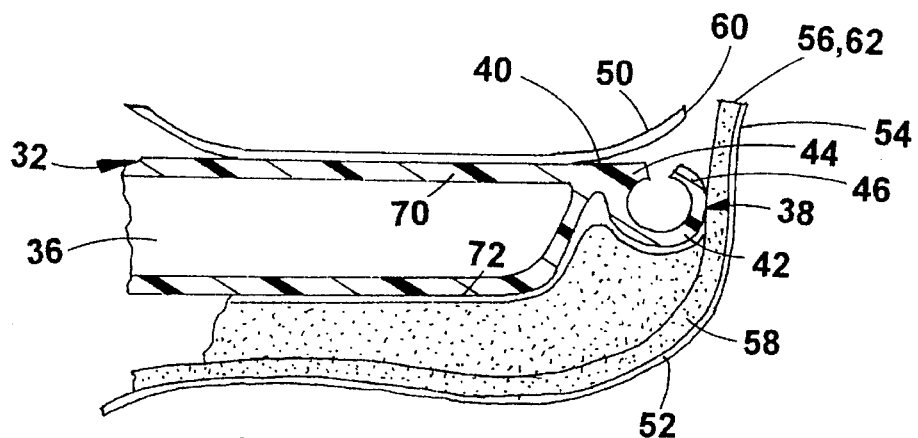
FIG. 3 is the view of FIG. 2 showing an alternative configuration of the upholstery attachment device.
Figure 4:
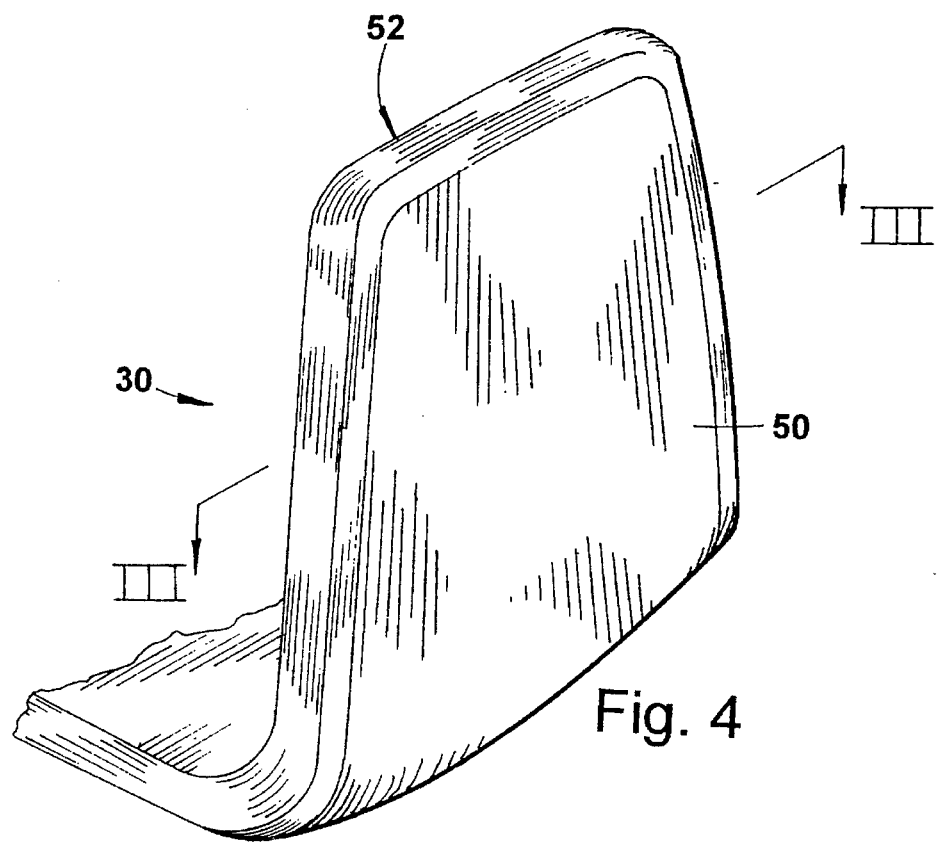
FIG. 4 is a fragmentary rear perspective view of a seating unit according to the configuration of FIG. 3.
Figure 10:
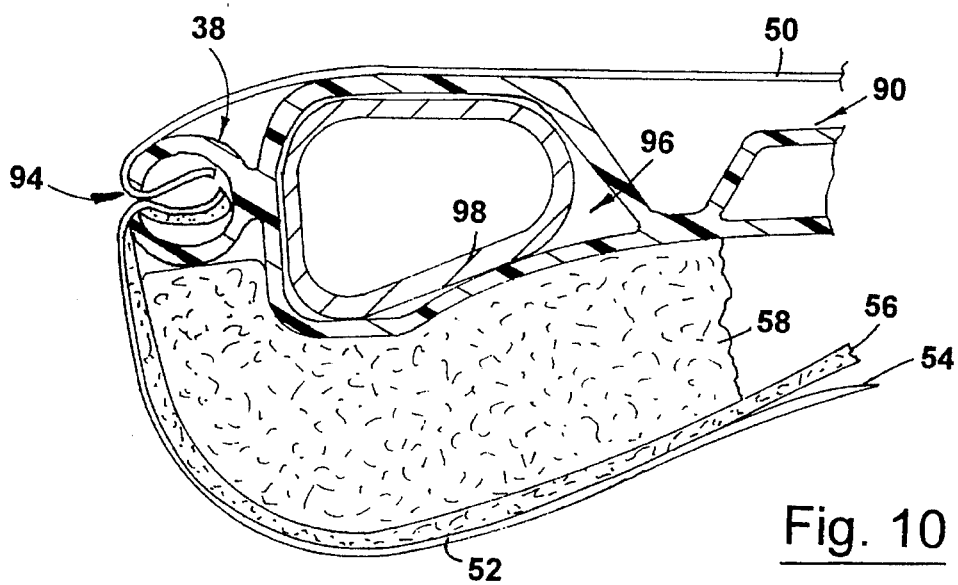
FIG. 10 is a fragmentary cross-sectional view along line X—X of FIG. 9, showing the seating unit back frame in upholstered condition.
Figure 11:
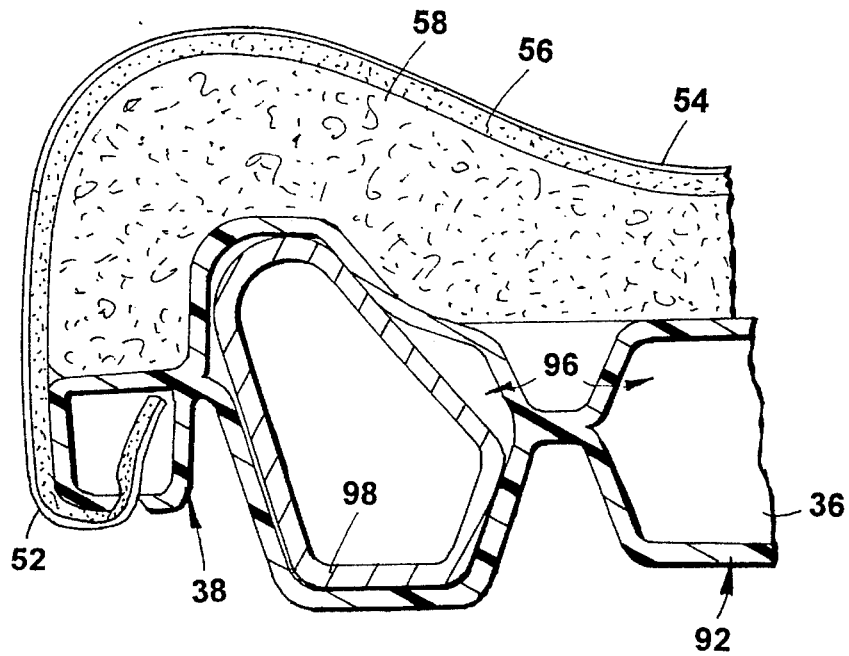
FIG. 11 is a fragmentary cross-sectional view along line XI—XI of FIG. 9, showing the seating unit seat frame in upholstered condition.
Figure 14:
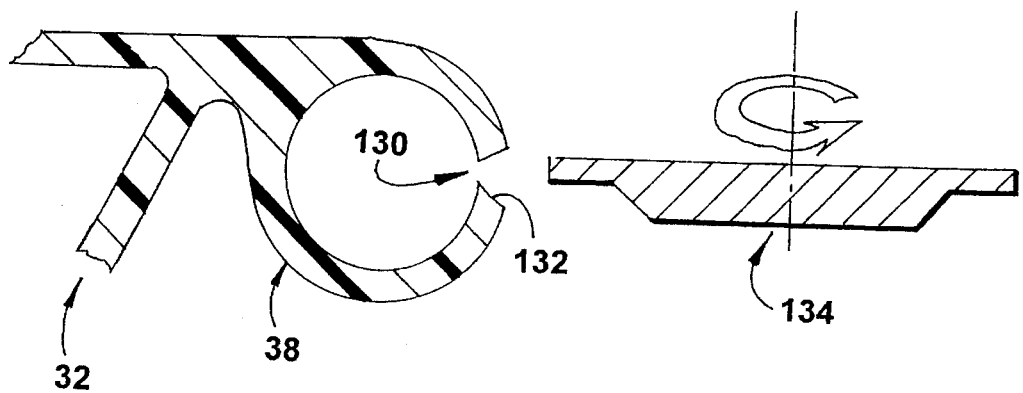
FIG. 14 is a schematic representation showing an alternative method of forming the invention.
Figure 15:
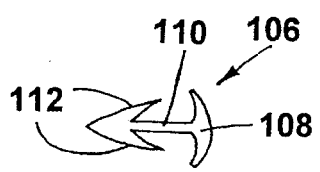
FIG. 15 is an end elevational view of an optional trim member used with the invention.
Figure 16:
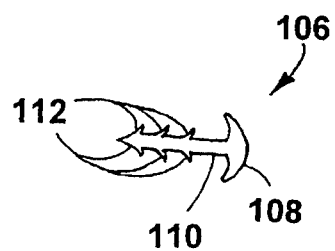
FIG. 16 is an end elevational view of an alternative optional trim member used with the invention.

In manufacture of an upholstery attachment device according to the invention, a groove or slot 120 having opposing beveled surfaces 122 may be routed with a router 124 along a generally tubular portion formed with a support frame 32 to create upholstery attachment device 38 which is particularly adapted to attach two upholstery coverings 50 and 52 and define an upholstery seam 94 therebetween in accordance with the configurations shown in each of FIGS. 2, 3, and 10. Alternatively, if only one side of a support frame is to be covered with upholstery as shown in the configurations of FIGS. 11 and 12, then, primarily for aesthetic purposes, an asymmetric groove or slot 130, having one beveled surface 132, may be milled with a cutting tool 134 as is schematically shown in FIG. 14.

In further embodiments (FIGS. 17–21) an upholstery attachment device 140 according to the invention may be a separate member for fastening an upholstery covering to the support frame 32. As shown in FIGS. 17 and 18, the upholstery attachment device 38 may be an open-sided channel member with a generally tubular body and a slot 142 running lengthwise down a side of the body. Barbs 144 extending to the inside of the body may be used to help resist withdrawing an upholstery covering from the upholstery attachment device, once the edge of the upholstery covering is inserted inside the attachment device.

As a separate member, the upholstery attachment device 140 may be seated in a groove or recess 150 formed in the support frame 32. The upholstery attachment device 140 may be provided with outward extending barbs 146 to secure the attachment device in the groove 150 and preclude or at least minimize pullout and withdrawing of the attachment device. Alternatively, the attachment device 140 may be bonded inside the groove 150 using commonly known adhesives or welding techniques.

In yet other embodiments, an upholstery attachment device 160 may be provided with cooperating external ridges 162 to snap-fit and secure the upholstery attachment device 160 in a slot 170 which is cut or otherwise provided and appropriately located in the support frame 32. One method may include initially forming support frame 32 with a protruding tab 180 and either cutting the end 182 of the tab off to form the interlocking slot configuration of FIG. 20 or to cut the tab 180 off flush with the shell 36 of the frame 32 to provide the interlocking arrangement of FIG. 19.

An additional advantage of providing the upholstery attachment device as a separate member 140 or 170 from the support frame 32 is the ability during the upholstering process to insert an edge of the upholstery covering into the upholstery attachment device 140 or 170 and capture the upholstery covering prior to attaching the upholstery attachment device to the support frame 32.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows.

1. A seating unit comprising:

a support frame; and an upholstery covering overlaying at least a portion of said support frame, said upholstery covering having a perimeter edge, said support frame including an upholstery attachment device, said upholstery attachment device being located at said upholstery covering perimeter edge, said upholstery attachment device having a first elongated portion extending along at least a length of said upholstery covering perimeter edge and defining a first upholstery covering gripping member, said upholstery attachment device having a second, cooperating elongated portion aligned with said first elongated portion to extend along said at least a portion of said length of said upholstery covering perimeter edge and define a second upholstery covering gripping member, said upholstery covering perimeter edge being interposed between said first and second upholstery covering gripping members, said first and second upholstery covering gripping members defining opposing jaws configured to frictionally engage and clamp against opposing sides of said upholstery covering perimeter edge to securely retain the upholstery covering therebetween.

2. The seating unit as defined in claim 1 wherein said jaws are spaced apart less than a thickness of the upholstery covering.

3. The seating unit as defined in claim 1 wherein said upholstery covering comprises multiple layers.

4. The seating unit as defined in claim 3 wherein at least one of said multiple layers covers at least a portion of a back of said support frame and at least another of said multiple layers covers at least a portion of a front of said support frame.

5. The seating unit as defined in claim 3 wherein at least one of said multiple layers comprises a different composition than other of said multiple layers.

6. The seating unit as defined in claim 1 wherein said upholstery attachment device extends substantially around a perimeter of said support frame.

7. The seating unit as defined in claim 1 including a trim strip having a barbed leg positioned between said first and second gripping members for frictionally engaging said upholstery covering.

8. The seating unit as defined in claim 7 wherein said leg defines a plurality of said barbs for retaining said trim strip to said upholstering attachment device.

9. The seating unit as defined in claim 1 wherein said gripping members define opposing barbs for engaging said upholstery covering.

10. The seating unit as defined in claim 1 wherein said support frame defines a seating component for a vehicle.

11. The seating unit as defined in claim 10 wherein said seating component comprises a head rest.

12. The seating unit as defined in claim 10 wherein said seating component comprises one of a back assembly and a seat assembly.

13. The seating unit as defined in claim 1 wherein said support frame substantially defines an entire seating unit.

14. The seating unit as defined in claim 1 wherein said support frame comprises a blow-molded construction.

15. The seating unit as defined in claim 1 including a cushion disposed between said upholstery covering and at least a portion of said support frame.

16. A seating unit comprising:

a support frame;

an upholstery covering overlaying at least a portion of said support frame, said upholstery covering having a perimeter edge and a thickness; and a pair of opposed gripping members connected to said support frame and defining a groove disposed along at least one side of said support frame, said groove having a width less than the thickness of said upholstery material retained therein, at least a portion of said perimeter edge of said upholstery covering being disposed between said opposed gripping members and held in place thereby.

17. The seating unit as defined in claim 16 wherein said upholstery covering comprises multiple layers.

18. The seating unit as defined in claim 17 wherein at least one of said multiple layers covers at least a portion of a back of said support frame and at least another of said multiple layers covers at least a portion of a front of said support frame.

19. The seating unit as defined in claim 17 wherein at least one of said multiple layers comprises a different composition than other of said multiple layers.

20. The seating unit as defined in claim 16 wherein said upholstery attachment device extends substantially around a perimeter of said support frame.

21. The seating unit as defined in claim 16 including a trim strip having a leg positioned between said gripping members for frictionally engaging said upholstery covering.

22. The seating unit as defined in claim 21 wherein said leg defines a barb for retaining said trim strip to said upholstering attachment device.

23. The seating unit as defined in claim 16 wherein said gripping members define opposing barbs for engaging said upholstery covering.

24. The seating unit as defined in claim 16 wherein said support frame defines a seating component for a vehicle.

25. A seating unit comprising:

an upholstery covering; and a molded support frame having an upholstery attachment device including elongated opposing gripping members extending across at least one edge of said support frame, said opposing gripping members including opposing barbs defining a groove whereby a width of said groove is less than a thickness and configured to frictionally engage and retain opposing sides of said upholstery covering in said groove without the use of an insert spacer.

26. The seating unit as defined in claim 25 wherein said gripping members are spaced apart a distance less than a thickness of said upholstery covering.

27. A support frame for a seating unit having an upholstery covering, comprising:

a molded shell having an upholstery attachment device integrally formed thereon, said molded shell defining a perimeter edge and said upholstery attachment device defining a pair of elongated upholstery gripping members having barbs that extend continuously across the perimeter edge and that are aligned and positioned proximate one another closer than a thickness of the upholstery covering so that the gripping members are configured to frictionally and securely engage opposing sides of the upholstery covering in opposition to each other when opposing sides of the upholstery covering is placed therebetween.

28. The support frame as defined in claim 27 wherein said molded shell defines a seating component for a vehicle.

29. The support frame as defined in claim 27 wherein said molded shell substantially defines an entire surface for a seating unit.

30. The support frame as defined in claim 27 wherein said molded shell comprises a blow molded construction.

* * * * *